(12) United States Patent
Valle et al.

(10) Patent No.: US 8,166,744 B2
(45) Date of Patent: May 1, 2012

(54) ARTICULATING PIN FOR BICYCLE CHAINS AND RELATIVE CHAIN

(75) Inventors: Maurizio Valle, Vicenza (IT); Leopoldo Lazzarin, Vicenza (IT)

(73) Assignee: Campagnolo S.R.L., Vicenza (IT)

( * ) Notice: Subject to any disclaimer, the term of this patent is extended or adjusted under 35 U.S.C. 154(b) by 489 days.

(21) Appl. No.: 12/413,009

(22) Filed: Mar. 27, 2009

(65) Prior Publication Data

US 2009/0258742 A1    Oct. 15, 2009

(30) Foreign Application Priority Data

Apr. 15, 2008    (EP) .................................... 08425253

(51) Int. Cl.
*B21L 21/00* (2006.01)
*B23P 21/00* (2006.01)
*B25B 27/14* (2006.01)

(52) U.S. Cl. .................... 59/7; 59/9; 59/11; 59/35.1

(58) Field of Classification Search ............... 59/7, 9, 59/11, 35.1
See application file for complete search history.

(56) References Cited

U.S. PATENT DOCUMENTS

| | | | |
|---|---|---|---|
| 547,964 | A | 10/1895 | Nesmith |
| 2,826,893 | A | 3/1958 | Morris Falk et al. |
| 3,943,702 | A | 3/1976 | Lacombe-Allard |
| 4,425,103 | A | 1/1984 | Foster |
| 4,494,945 | A | 1/1985 | Ogino |
| 4,998,907 | A | 3/1991 | Sawada et al. |
| 5,178,585 | A | 1/1993 | Lin et al. |
| 5,251,341 | A * | 10/1993 | Seals .................................. 59/7 |
| 5,362,282 | A | 11/1994 | Lickton |
| 5,461,852 | A | 10/1995 | Nagamatsu |
| 6,176,798 | B1 | 1/2001 | Nakamura |
| 6,364,799 | B1 | 4/2002 | Campagnolo |
| 6,880,323 | B2 * | 4/2005 | Coleman ............................ 59/7 |
| 7,721,520 | B2 * | 5/2010 | Komeya et al. .................... 59/7 |
| 2003/0022748 | A1 | 1/2003 | Meggiolan |
| 2009/0258742 | A1 | 10/2009 | Valle |

FOREIGN PATENT DOCUMENTS

GB    319503 A    9/1929

\* cited by examiner

*Primary Examiner* — David Jones
(74) *Attorney, Agent, or Firm* — Volpe and Koenig, P.C.

(57) ABSTRACT

An articulating pin for the links of a bicycle chain, of the type capable to be inserted in aligned holes of an outer link and of the corresponding inner link of the chain, to hinge the links to one another, has a central portion and a distal portion. The distal end is elastically deformable for the insertion through the holes.

3 Claims, 14 Drawing Sheets

ARTICULATING PIN FOR BICYCLE CHAINS AND RELATIVE CHAIN

FIELD OF INVENTION

The present invention refers to an articulating pin for bicycle chains and to a chain assembled with such a pin.

BACKGROUND

Conventional bicycle chains are manufactured as a succession of inner links alternating with outer links. Each outer link consists of a pair of opposite and spaced plates, hinged at their ends, at the respective inner faces, to a pair of plates that constitute the inner links. The inner links define a gap smaller than that defined by the outer links, but still sufficient to house a tooth of a sprocket or of a crown of the respective bicycle. The plates that constitute the inner links are kept spaced apart through pins that, during operation, go into abutment on the sides of the teeth of the sprockets or of the crowns of the bicycle.

The plates that form the inner and outer links of the transmission chain are provided with through holes. In the final assembling step of the chain, an articulating pin is inserted in the aligned holes of an outer link and of an inner link. In this way, the inner links are hinged to the outer ones. In other words, the aligned holes of an outer link and of the corresponding inner link provide for the seat of an articulating pin.

The articulating pin is not just a hinge between the links of the chain, it also has the task of transferring, during pedaling, the mechanical stresses from the inner links to the outer ones, and vice-versa, without undergoing deformations. In other words, the articulating pin is the linking element between the links of the chain intended to transfer the mechanical loads, mainly the traction forces. Within this meaning, the articulating pin distinguishes itself from the simple locking or reinforcing elements often provided in conventional chains.

Usually, the solutions available on the market provide assembling of the chain through riveting of the articulating pin. The pin comprises a head having a greater diameter than the diameter of the holes of the links. Once the pin has been completely inserted in the links, the head of the pin goes into abutment against the outer face of a first plate of the outer link, at a first hole. The portion of the pin opposite to the head, i.e. the distal portion, is riveted, i.e. is subjected to a permanent plastic deformation by means of which a counter-head is obtained. The diameter of the counter-head is greater than the diameter of the second hole present on the second plate of the outer link. In this way, the articulating pin is locked at its ends against the disengagement from the links. The riveting is often carried out manually by means of a suitable tool, equipped with a punch capable to be at least partially inserted in the distal portion of the pin and with thrusting means of the punch.

The insertion of the articulating pins in the corresponding links to assembly a chain is a delicate step, since imprecise insertion may cause the local deformation of the chain and may jeopardize its functionality. Normally, chains are sold in an open condition and the end user has the task of inserting the last articulating pin to configure the chain at the desired length. Also in the circumstance in which a used chain must be disassembled and assembled again it is necessary to insert an articulating pin to articulate the final links.

Normally, the links of a chain that are subject to the extraction of the relative pin are replaced with new links. The new links are available in repair kits that also include the articulating pins. Also for new links it is necessary to provide for the maximum precision of insertion of the corresponding articulating pin. Disadvantageously, repair kits are relatively expensive.

SUMMARY

An articulating pin of links of a bicycle chain may be inserted in aligned holes of an outer link and of the corresponding inner link of the chain, to hinge the links to one another. The pin may comprise a central portion and a distal end, wherein in that the distal end is at least in part elastically deformable for insertion through the holes.

A locking button may also be inserted in an articulating pin on which two links of the chain are hinged, to prevent it from slipping off. The locking pin is plastically deformable to prevent deformations or movements of the inner walls of the articulating pin in the radial direction, towards the relative axis.

BRIEF DESCRIPTION OF THE DRAWINGS

Further characteristics and advantages of the invention shall become clearer from the following description, made with reference to the attached drawings, wherein.

DETAILED DESCRIPTION OF THE PREFERRED EMBODIMENTS

Introduction to the Embodiments

Figure 1:
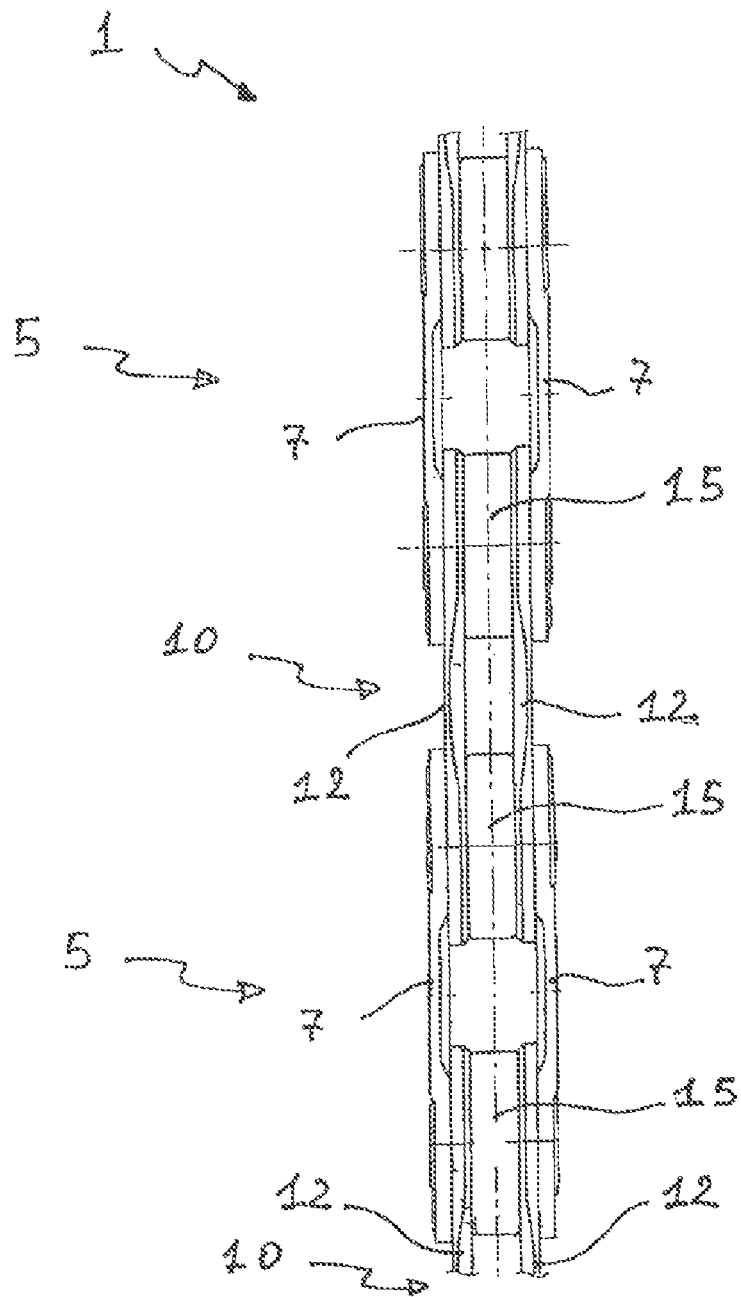
FIG. 1 is a view from above of a chain according to the present invention.

An articulating pin of links of a bicycle chain may be inserted in aligned holes of an outer link and of the corresponding inner link of the chain, to hinge the links to one another. The pin may comprise a central portion and a distal end, wherein in that the distal end is at least in part elastically deformable for insertion through the holes.

With reference to the claims, by the expression "articulating pin" it is intended to identify the element that, in bicycle transmission chains, is used to hinge together the links and to transmit the mechanical stresses applied to the inner links to the outer links, and vice-versa. In other words, the articulating pin is configured both like a hinge of the corresponding links and as a transmission element of the mechanical stresses, and in particular the longitudinal stresses to the chain.

Insertion of the pin through the holes of the links of the chain can also be an insertion after a previous use of the pin. In other words, after a first insertion, the pin can be extracted from the chain and the distal portion of the pin can conserve a residual elasticity sufficient to allow the insertion of the pin through the holes of the links of a second chain.

The distal end, i.e. the end portion of the pin, elastically deforms to allow the insertion of the pin in the holes of the links, avoiding harmful mechanical interferences with the inner walls of the holes. Thus, the surface hardness of the articulating pin, or of the elastic distal end, may be lower than the hardness of the material of the links of the chain.

The complete insertion of the pin through the corresponding inner and outer links may take place together with the elastic return of the distal end into its non-deformed configuration. In other words, the articulating pin allows the transmission chain to be assembled by snap coupling with an outer link of the chain.

The articulating pin can be inserted in the holes of the links and coupled with them, or else decoupled and slipped off many times, without deforming or damaging the plates and, therefore, the links themselves. The distal end, while deforming elastically, prevents jamming or interference of the pin within the holes of the links.

The articulating pin does not necessarily have to be riveted on the corresponding outer link. The snap coupling is sufficient to ensure the mechanical seal during normal conditions of use of the chain.

The articulating pin may comprise a central portion and a top portion, opposite the distal end, intended to go into abutment against the outer surface of a plate of the corresponding outer link of the chain.

The central portion of the articulating pin is cylindrical and its outer surface is continuous. The absence of holes, notches, openings, cavities and, in general, of discontinuities in the surface of the central portion allows for a uniform distribution of the mechanical tensions on such a portion to be obtained. The distribution of the load between the pin and the corresponding links is uniform in the radial direction, i.e. both when the chain is on a rectilinear path, and when it winds on a gear wheel. Moreover, the absence of discontinuities on the surface of the central portion minimizes the wear of the inner walls of the holes of the inner link, which slide directly on the central portion of the pin.

The elastic deformation of the distal end of the pin occurs mainly in the radial direction. In the initial step of the insertion of the pin within the aligned holes of the links, the distal end elastically deforms towards the axis of the pin, under the action of the force generated by the interaction with the inner walls of the holes.

In the embodiment in which the complete insertion of the pin is provided, the distal end comes out from the outer link and undergoes an elastic return in the opposite direction, returning into the initial configuration. In other words, the distal end snaps into the assembled position of the chain when, pushed outside of the exit hole of the outer link, undergoes an elastic return and its perimetric portion sets to a greater diameter than the diameter of the hole of the link. When the pin is completely inserted through the links of the chain and the distal portion has snapped into the engaged position, accidental disengagement is prevented by the same distal portion that goes into abutment against the outer wall of the outer link.

The distal end may be hollow and has at least one notch that extends in the diametral direction and in the axial direction.

The presence of the notch facilitates the radial deformation of the distal end, towards the axis of the pin and in the opposite direction. More preferably, the distal end comprises two or more diametral notches. The presence of many notches, above all if distributed equidistant one to another, allows a uniform deformation of the distal end along its circumferential extension to be obtained.

In the circumstance in which the snap coupling of the pin with the outer link of the chain is provided, the non-deformed distal end has a greater outer diameter than the outer diameter of the central portion of the pin.

The distal end may be tapered in the direction of insertion in the holes of the links of the chain and has a surface for the abutment against the outer wall of the link in the closed position, for example an "undercut" (or else a flat surface) that prevents the slip-off of the pin.

A suitable material to make the articulating pin from is, for example, a titanium alloy or steel having carbon content equal to 0.20% or higher. These materials ensure a sufficient elasticity of the distal end of the pin and, at the same time, a sufficient resistance of the remaining parts against mechanical stresses. The surface hardness of the pin may be greater than or equal to 500 $HV_{0,1}$.

In a second aspect thereof, a locking button for articulating pins of bicycle chains is disclosed. Specifically, a locking button for a bicycle chain, of the type able to be inserted in an articulating pin on which two links of the chain are hinged, to prevent the same from slipping off, wherein in that it is plastically deformable to prevent deformations or movements of the inner walls of the articulating pin in the radial direction, towards the relative axis.

The locking button is plastically deformable in the radially outer direction, i.e. in the direction away from the axis of the pin, to prevent the elastic deformation of the distal end in the radially inner direction, i.e. towards the axis of the pin.

In the deformed configuration, the outer walls of the locking button are in abutment against the inner walls of the articulating pin and, actually, prevent its elastic deformation towards the axis of the pin. In other words, by plastically deforming the locking button the locking of the articulating pin on the outer link is established. The axial slip-off load of the pin is at its maximum when the locking button is plastically deformed to prevent the elastic compression of the distal end, with clear benefits in terms of the mechanical seal of the pin-links coupling.

In a first embodiment, in its non-deformed configuration the button is a separate element insertable, with interference or with clearance, in an inner cavity of the corresponding articulating pin. The clearance reduces, or goes completely to zero, when the button is brought into its deformed configuration.

The locking button may comprise an inner cavity suitable for the insertion of an outer deformation tool and/or of a guide element of the pin. The deformation element can, for example, be a punch.

In a second embodiment, the locking button can be made in one piece with the articulating pin. Before undergoing the aforementioned plastic deformation, the button is substantially separated from the inner walls of the distal end by an annular gap.

The distal end has a first inner diameter sufficient to receive at least in part the locking button. A portion of the central portion has a second inner diameter smaller than the first inner diameter of the distal end. In practice, the articulating pin is hollow and the inner hole is blind or narrows towards the top portion to prevent the locking button from slipping-off from the part of the top portion of the pin. In this way, the locking button is deformable inside the elastic distal end with a tool that penetrates at that same end, without the risk of the same locking button being able to be expelled through the top portion of the pin.

Alternatively, the inner hole of the articulating pin is tapered, i.e. it is open towards the outside at the distal end and narrows, for example like a cone, in the opposite direction.

According to a further embodiment, the articulating pin comprises at least one annular recess formed on its inner surface. A corresponding annular projection is formed on the outer surface of the locking button to achieve a shape coupling, and with interference, with the annular recess.

The articulating pin also may comprise a guide element having the function of facilitating the centering and the insertion inside the holes of the links. The guide element is configured like an appendix of the locking button and has a smaller maximum diameter than the diameter of the holes of the links and than the diameter of the button itself. During the closing step of the chain, the guide element is the first to be inserted in the holes of the links and avoids arising of potentially harmful interferences between the walls of the articulating pin or of the inner core and the walls of the holes. The guide element may be integral with the inner core, and removable (for example by shearing or fracturing), or else it may be a distinct element, capable to be fixed in a non-permanent manner to the inner core, for example capable to be inserted in part in an inner cavity of the locking button.

Alternatively, the guide element is integral with the locking button and extends from a collar having reduced section, suitable of being sheared, fractured or in any case easily separable, provided at the end of the button opposite to the top portion of the pin.

The locking button may also made from steel having a carbon percentage greater than or equal to 0.20%.

In a third aspect thereof, a locking assembly of a bicycle chain is disclosed.

In particular, the locking assembly for a bicycle transmission chain comprises at least one articulating pin, such as any of the articulating pins described above, and a corresponding plastically deformable locking button to prevent deformation or movements of the inner walls of the articulating pin in the radial direction, towards the relative longitudinal axis.

In a fourth aspect, a transmission chain for bicycles is disclosed.

In particular, the transmission chain comprises a succession of outer and inner links hinged through corresponding articulating pins, at least one of the articulating pins being one of the articulating pins described above.

The articulating pin may be equipped with an elastically deformable end for the snap coupling with the corresponding outer link and to close the chain.

The articulating pin may be of the type described above in relation to the first aspect of the present invention.

The coupling element of the links, i.e. the articulating pin that acts as a hinge and at the same time as a stress transfer element, is able to be snap-fixed to the corresponding outer link. This characteristic substantially simplifies the assembling operation of the chain, without having a negative impact upon the seal of the coupling and upon the performance of the chain as a whole.

Compared to conventional solutions, the articulating pin does not necessarily have to be riveted. The assembling of the chain can therefore be completed, quickly and effectively, by snapping the elastic end of the pin on the outer link.

The transmission chain may comprise at least one locking button described above in relation to the second aspect of the invention.

A pin may be rotatably coupled with the outer surface of annular flange of the inner links. The pin protects the pin against wear by friction against the teeth of sprockets or crowns. According to an alternative embodiment, the chain does not have the pin and the articulating pin is sized and configured to also act as pin, i.e. to interact directly with the teeth of sprockets and crowns.

The distal end of the pin, i.e. the elastically deformable end portion, may be at least partially housed in a space inside the outer link even when the snap coupling is completed. In this way, the distal end is at least in part protected against knocks that could damage it or cause it to slip-off.

The articulating pin may be hinged to the outer link at two annular projections of the central portion, i.e. at two annular thickenings of the central portion.

The length of the articulating pin may be selected so that the distal end projects at least in part beyond an outer wall of the outer link on which it is fixed, when the top portion is in abutment against the other outer wall of the link itself. In other words, when the top portion is in abutment against the outer link, the distal end, which has snapped into its non-deformed configuration, is not in abutment against the outer surface of the link. The length of the pin is slightly greater than the distance between centers between the holes of the outer link. This characteristic allows the distal end to expand completely after insertion, giving a sensation perceptible to the operator, confirming the successful coupling. The perceived sensation may, for example, be a sudden decrease in resistance to insertion, or a sound produced by the elastic return of the distal end.

The insertion of the articulating pin in the aligned holes of the corresponding links of a chain is preferably obtained by means of a tool for closing chains. The tool can also be used to deform the locking button aforementioned, without expelling the pin from the links.

In a fifth aspect thereof, a tool for assembling bicycle chains is disclosed.

In particular, the tool for assembling a bicycle chain comprises an abutment element able to be moved between a non-operative position, at which the insertion of an articulating pin through links of the chain is permitted, and an operative position, at which the axial slip-off of the articulating pin from the links is prevented in presence of a thrust applied on the same articulating pin, along the relative longitudinal axis, wherein in that the abutment element is provided on a support hinged to the main body of the tool.

At least one from the support element and the abutment element is interchangeable to reset the optimal conditions following wear of the abutment element itself.

DETAILED DESCRIPTION

With reference to FIG. 1, a chain 1 comprises outer links 5 alternating with inner links 10, articulated to one another. Each outer link 5 comprises a pair of outer plates 7, arranged parallel to one another and spaced apart for the interposition of the inner links 10. Each inner link 10 comprises a pair of inner plates 12 arranged parallel to one another and spaced apart for the interposition of a pin 15.

The outer plates 7 are substantially flat and comprise through holes 17 at their ends.

Figure 2:
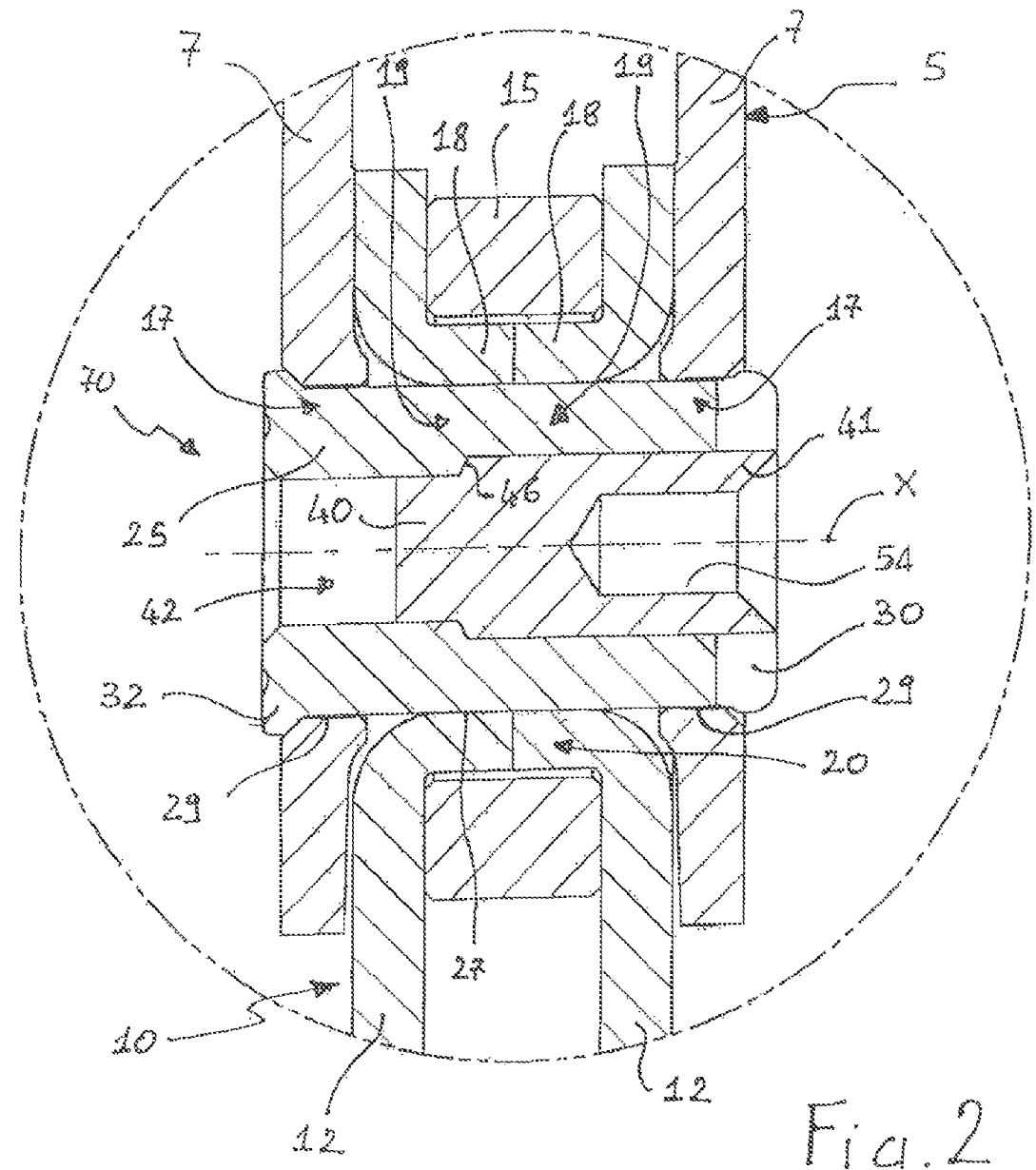
FIG. 2 is a longitudinal section, and enlarged, of a detail of the chain shown in FIG. 1.

The inner plates 12, differently, have curved ends to form annular flanges 18, which extend axially around holes 19 shown in FIG. 2.

As shown in FIG. 2, the outer and inner links 5, 10 are over one another at the respective ends so that the holes 17 and 19 are aligned with each other and aligned with a hole 20 at the centre of the pin 15, according to a common longitudinal axis X. At least one outer link 5 and one inner link 10 of the chain 1 are hinged to an articulating pin 25 inserted in the aligned holes 17 and 19. The binding is such that the links 5 and 10 rotate relative to the pin 25 and with respect to each other.

Figure 3:
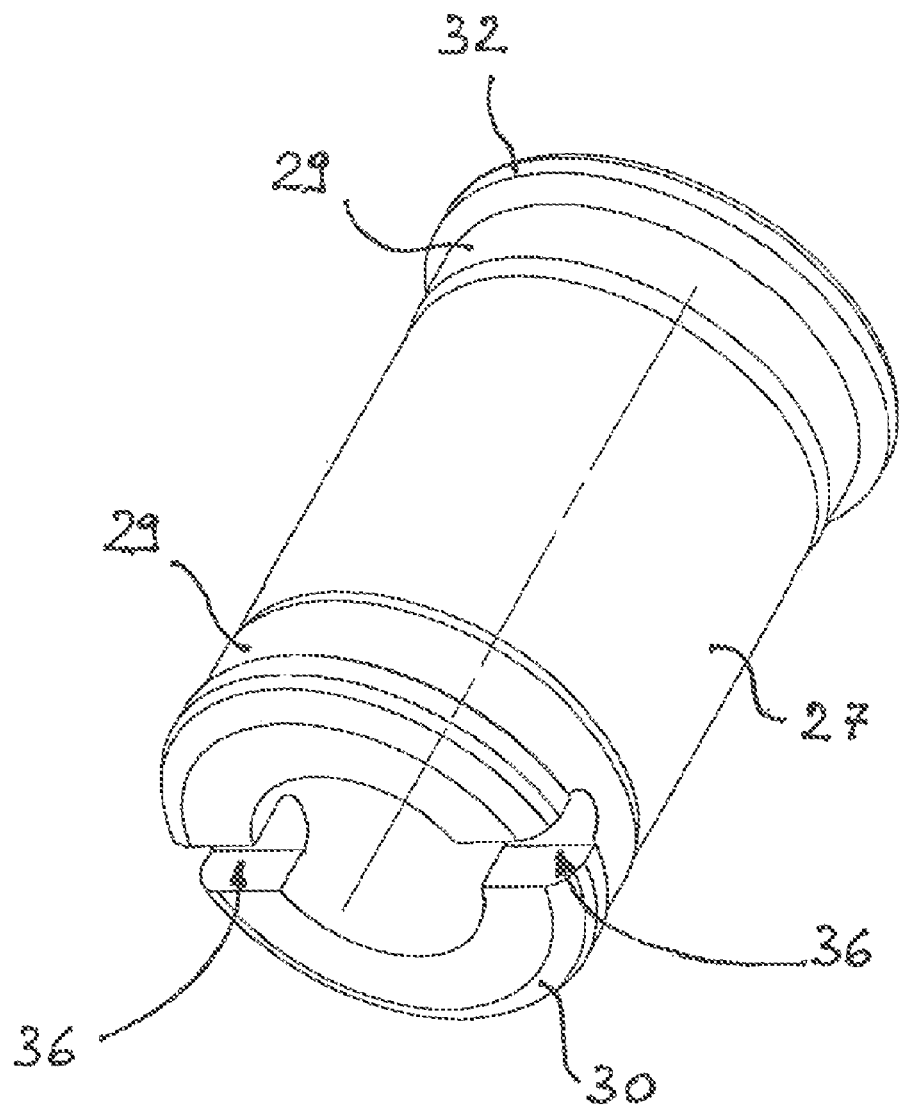
FIG. 3 is a perspective view of an articulating pin according to the present invention.

With reference to FIG. 2 and in particular to FIG. 3, the articulating pin 25 comprises a central portion 27 having a continuous cylindrical outer surface, i.e. without discontinuities like, for example, openings, cavities, notches, markings, etc.

At each end of the central portion 27 of the pin 25 there may be a thickening 29, i.e. an annular portion having a greater diameter than the diameter of the central portion 27. The thickenings 29 couple directly with the outer plates 7 at the holes 17. Alternatively, the central portion 27 can extend beyond the thickenings 29.

The articulating pin 25 also comprises, in a position axially farther out with respect to the thickenings 29, a top portion 32 and a distal portion 30, also defined as distal end 30.

The distal end 30, opposite the top portion 32, is intended to be inserted first into the holes 17 and 19. The top portion 32 acts as an end-of-travel portion for the pin 25 during the insertion in the holes 17, 19, getting into abutment against the outer surface of the plate 7.

The distal end 30 is elastically deformable to insert into the holes 17, 19 without damaging the links 5, 10.

The distal end 30 is intended to snap-engage the outer link 5. In particular, the distal end 30 is at least in part elastically deformable in the radial direction, towards the longitudinal axis X, when, during the insertion of the articulating pin 25 in the links 5 and 10, interacts with the inner walls of the holes 17, 19. The distal end 30 undergoes an elastic return, in the opposite direction to that of the first deformation, when it goes at the exit portion 38 of the hole of the outer link 5 opposite that of insertion of the pin 25.

The possibility of the distal end 30 elastically deforming just enough to make it snap onto the outer surface of the exit 38 is mainly due to the intrinsic characteristics of the material from which the articulating pin 25 is made and its geometry. The pin 25 may be made from steel having a carbon percentage equal to 0.2% or higher. The carbon percentage in the steel may be higher than 0.5%. For example, suitable steels are those normally used to manufacture springs. Alternatively, the articulating pin 25 is made from a titanium alloy, preferably comprising one or more of the following elements: vanadium, aluminum, chrome, tin. Even more preferably, the titanium alloy is of the type not suitable for undergoing heat treatments.

The pin 25 may be heat treated and/or coated to obtain a surface hardness greater than 500 $HV_{0,1}$, more preferably greater than 1500 $HV_{0,1}$, and even more preferably greater than 2500 $HV_{0,1}$. The slip-off load of the pin 25 is preferably within the range 200-300 $Kg_f$ (roughly 1960-2940 N). The aforementioned surface hardness values ensure a sufficient resistance of the pin 25 against wear.

Figure 4:
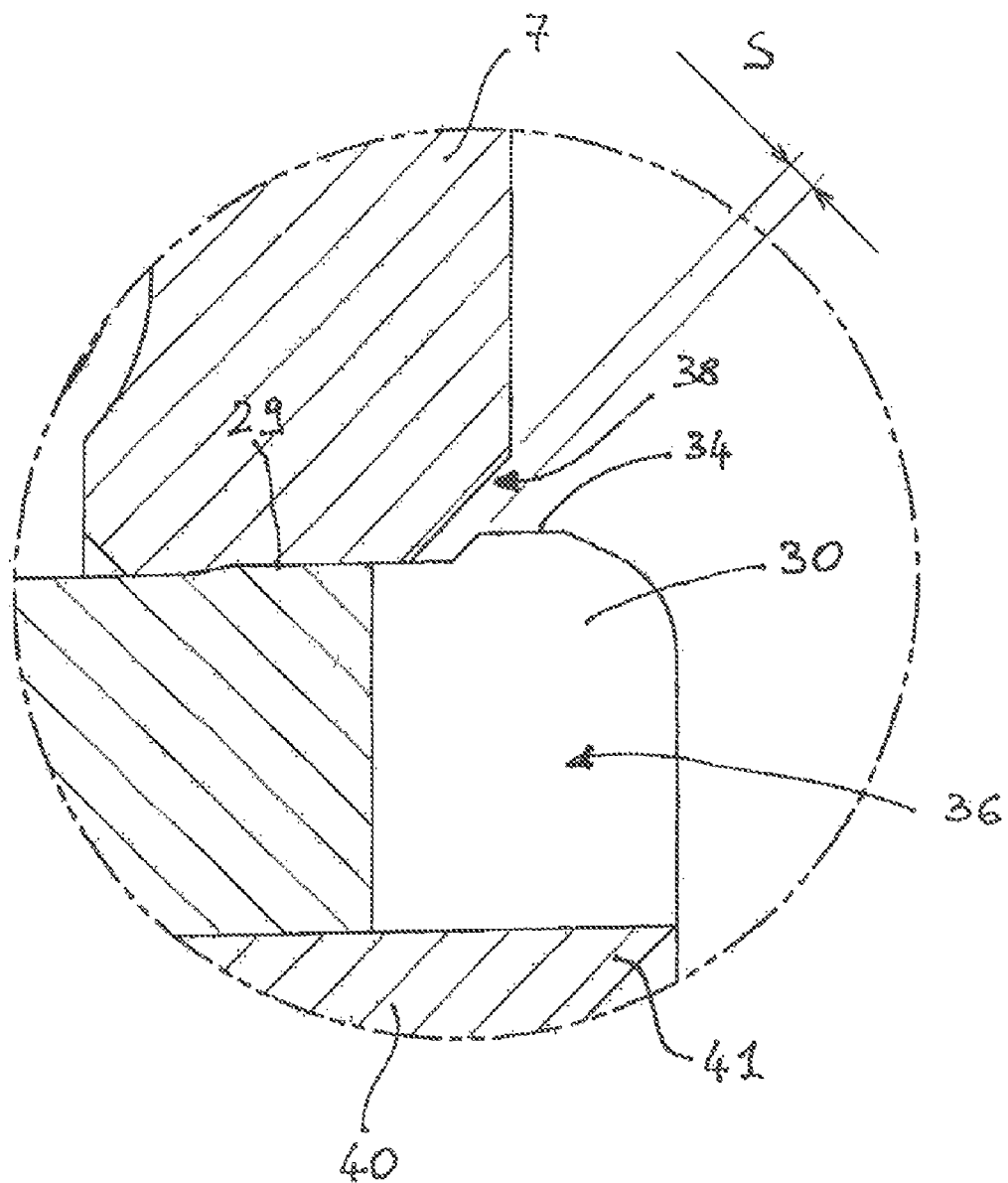
FIGS. 4 and 5 are enlarged longitudinal section views, of details shown in FIG. 2.

In general, however, the material of the articulating pin 25 has characteristics such as to allow an elastic deformation of the peripheral portion 34 towards the axis X, when the peripheral portion 34 itself interacts with the inner walls of the holes 17 and 19 during insertion and, when provided, to allow an elastic return of the peripheral portion 34 into the initial configuration, in the opposite direction to the previous one, upon completion of the insertion (FIG. 4). The material of the articulating pin 25 is in any case sufficiently tough to withstand the stresses generated by the insertion, i.e. the stresses due to the interaction with the inner walls of the holes 17 and 19 of the links 5 and 10.

FIG. 4 shows, in section, a detail of the distal end 30. The peripheral portion 34 extends along the outer edge of the distal end 30. In the non-deformed configuration, i.e. before the insertion of the pin 25 in the links 5 and 10 and after the insertion has been completed, the diameter of the distal end 30 at the peripheral portion 34 is greater than the diameter of the central portion of the pin 25 and of the relative thickenings 29. The peripheral portion 34 may be sized to ensure a minimum axial slip-off load of the pin 25 from the links 5 and 10 greater than 200 $Kg_f$ (about 1960 N). In other words, the thickness of the articulating pin 25 at the peripheral portion 34 is such as to ensure the seal of the pin-links coupling in normal conditions of use of the chain 1.

The distal end 30 may comprise at least one notch 36 (in FIG. 3, there is just one notch and engages two portions of the circumference of the distal end 30) that extends in the diametral direction and in the axial direction, interrupting the continuity of the peripheral portion 34. The distal end 30 may also comprise two or more notches 36 (solution not shown). Alternatively, the distal end 30 comprises at least three perimetric notches (not shown) arranged equally spaced on its circumference (according to a three-pointed star configuration) that extend in the axial direction.

The notch 36 facilitates the elastic deformation of the peripheral portion 34 towards the axis X of the pin, i.e. it facilitates the deformation that leads to a temporary reduction in diameter of the portion 34.

The notch 36 may extend in the axial direction until it engages a part of the thickening 29. Alternatively, the axial extension of the notch, or of the notches, 36 can be less than that described above, i.e. it may not engage the thickening 29.

With reference to FIG. 4, the exit 38 of the hole 17 through the plate 7 of the outer link 5 is countersunk towards the outside to at least partially receive the distal end 30 and in particular the peripheral portion 34 that goes back into its non-deformed configuration upon completion of the insertion of the pin 25.

The length of the pin 25 may be greater than the distance between centers between the holes 17 of the outer link 5. In this circumstance, the peripheral portion 34 does not go into abutment against the surface of the exit 38, but there is a gap S between the two elements. The peripheral portion 34 snaps into the non-deformed configuration, at maximum diameter, at the same time as the completion of the insertion of the pin 25, providing a signal perceptible by the operator, confirming the completion of the coupling. The signal can, for example, be a sudden decrease in resistance to the insertion of the pin 25, or a sound produced by the snapping of the peripheral portion 34.

Figure 5:
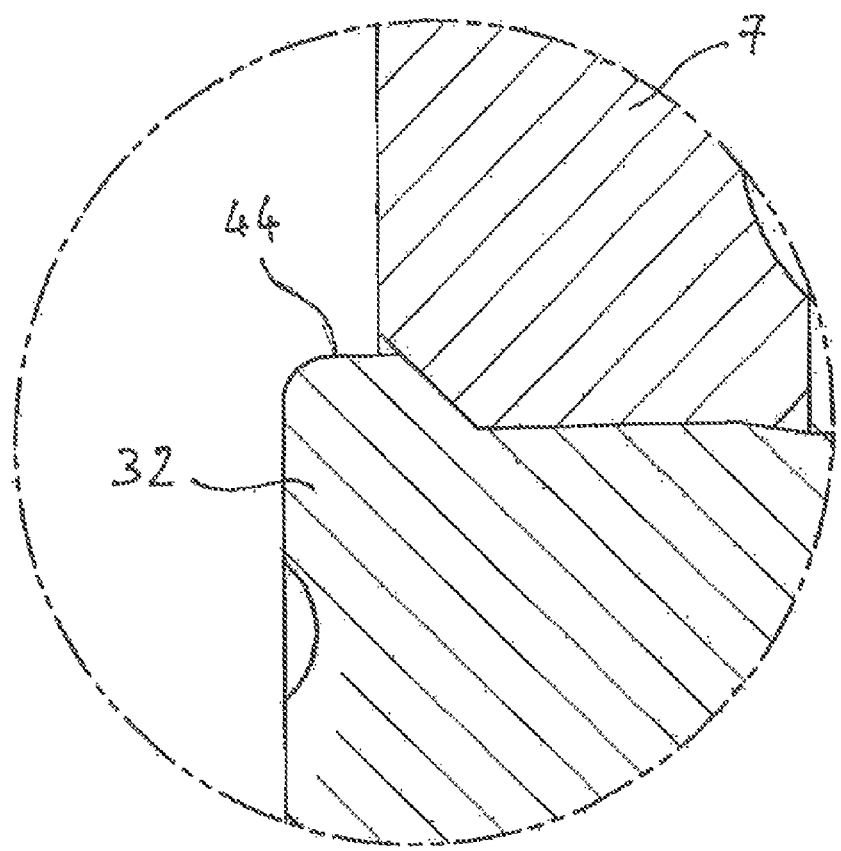

With reference to FIG. 5, the top portion 32 of the pin 25 may comprise a flange 44 extending in the radially outer direction with respect to the axis X and intended to stop in abutment against a plate 7 of an outer link 5. Again with reference to FIG. 2, the articulating pin 25 may be hollow, i.e. it is equipped with an axial inner through-hole 42. The inner diameter of the inner hole 42 can be constant along the axis X, but such a diameter slightly increases near to the distal end. In other words, the inner hole 42 is preferably tapered.

A locking button 40 is coupled with the articulating pin 25. In general, the locking button has the function of preventing the slip-off of the pin 25 from the links 5 and 10 in certain conditions of use of the chain 1. The locking button 40 is plastically deformable to exert a pressure against the inner walls of the hole 42 of the articulating pin 25 and prevent deformations or movements of such walls in the radial direction, towards the longitudinal axis X.

The articulating pin 25 and the relative locking button 40 form an assembly 70 to close a chain 1.

An embodiment of the locking button 40 is shown in FIG. 2, coupled with the relative pin 25, in turn snapped on the links 5 and 10 of the chain 1.

The locking button 40 is plastically deformable at least at its walls 41, intended to flank the inner walls of the distal end 30 of the articulating pin 25. The walls 41 of the locking button 40 define an inner and axial hole 54.

The articulating pin 25 and the corresponding locking button 40 have a substantially cylindrical extension, or in any case each extend with a geometry with cylindrical generatrices. Therefore, the walls of the button 40 radially outside the hole 54 form an annular flange 41 with axial extension. The thickness of the annular flange 41, i.e. the thickness in section of the walls 41, is selected so as to promote the plastic deformation of the same flange 41.

Alternatively, the articulating pin 25 and the corresponding locking button 40 have a substantially cylindrical extension, but with portions that extend with a geometry with conical generatrices.

The locking button 40 may be made from steel with a carbon percentage higher than 0.2%, preferably higher than 0.5%. Even more preferably, the locking button 40 is made from stainless steel, for example of the martensitic type. The cited materials allow the plastic deformation of the locking button 40 (or at least of the flange 41) in the cavity 42 of the pin 25, at the same time minimizing the risk of exerting an excessive pressure on the walls of the distal end 30. In other words, the quoted steels allow the button 40 to deform closing against the inner walls of the articulating pin 25, without running the risk of breaking the distal end 30.

The cited materials ensure the seal of the locking button 40 under the action of the aforementioned slip-off loads. In other words, if subjected to a slip-off load lower than 300 kg$_f$, the flange 41 does not deform, preventing the radial elastic deformation of the pin 25 and its expulsion from the links 5 and 10.

The hole 42 of the pin 25 has a first diameter at the top portion 32 that is smaller than a second diameter at the distal end 30. On the inside, the hole 42 can be tapered or it can foresee a rapid narrowing in section at the shoulder 46. The shoulder 46 is configured like a limit switch surface for the locking button 40, which is inserted into the hole 42 through the exit 38, avoiding its expulsion through the top portion 32. Alternatively, the hole 42 can be blind, i.e. closed at the top portion 32.

The locking button 40 may be inserted into the hole 42 of the pin 25 with interference, to maximize the slip-off load in conditions of use. Alternatively, the button is inserted with clearance into the hole 42, for the presence of an annular gap between the two elements, and the clearance is cancelled out once the button has deformed. In both cases, the plastic deformation of the locking button 40 is obtained by inserting a foreign body into the inner hole 54 when the button 40 is housed in the pin 25 snapped shut on the links 5 and 10.

Figure 6:
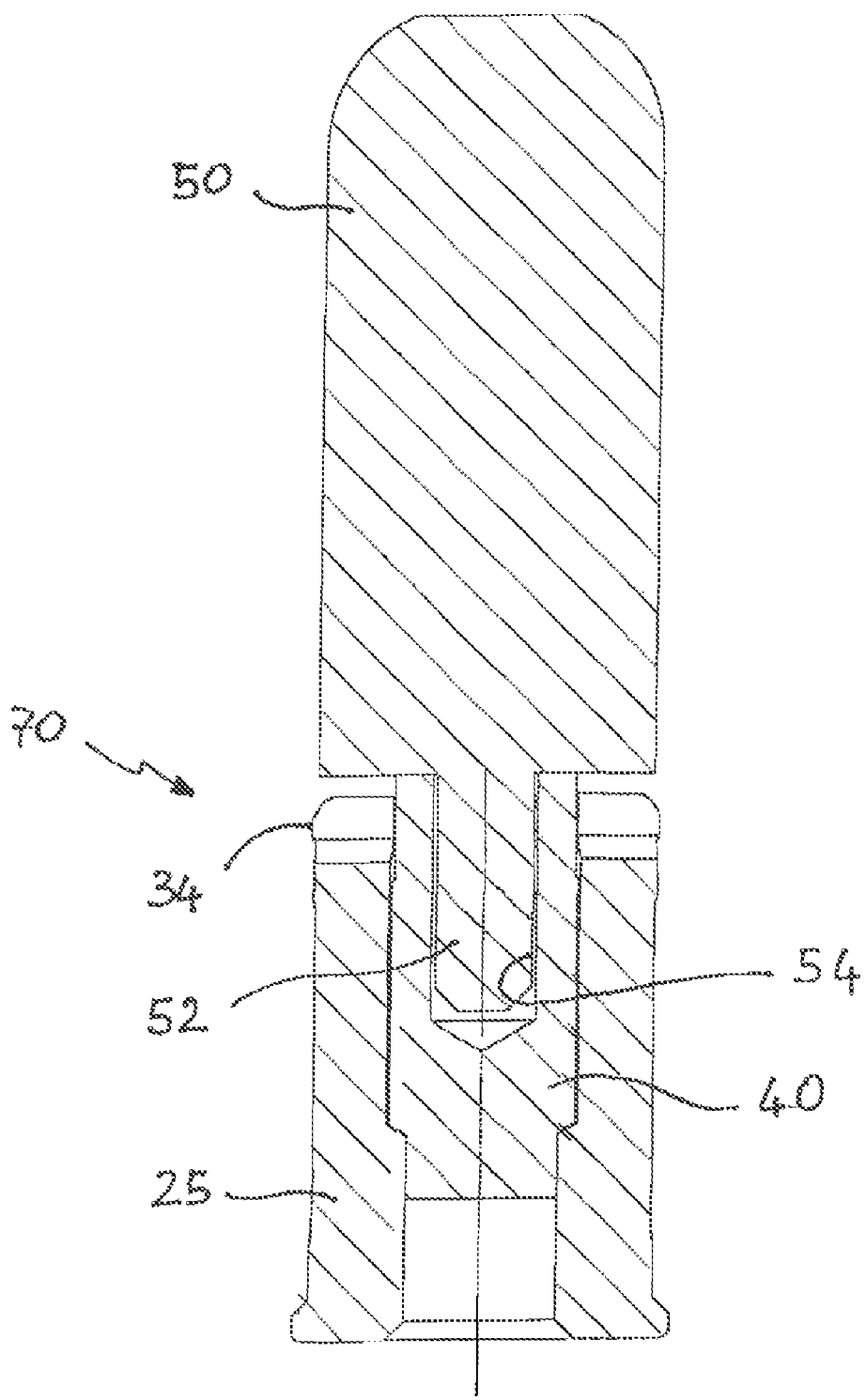
FIG. 6 is a longitudinal section view of a first embodiment of an assembly according to the present invention.
Figure 7:
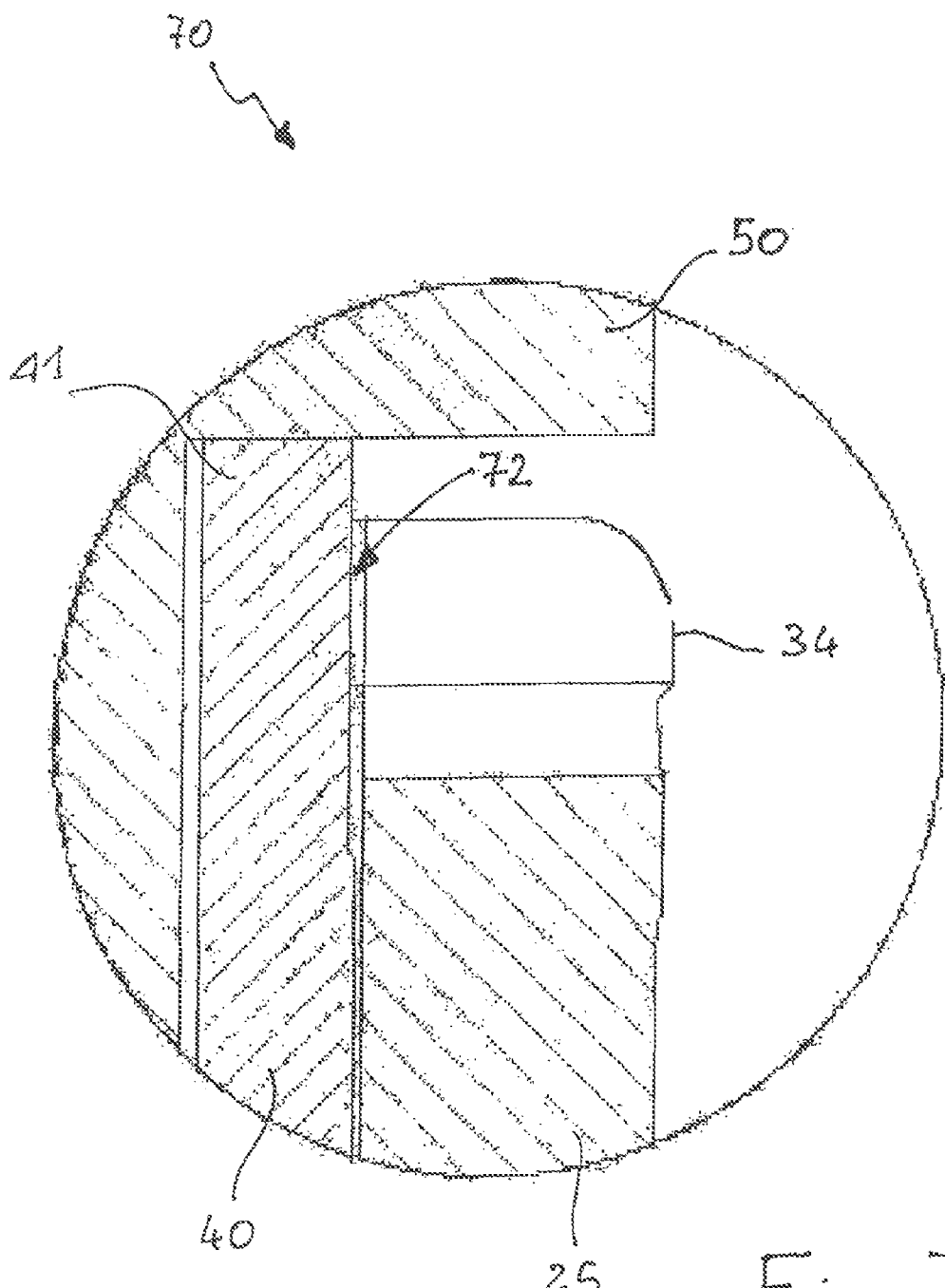
FIG. 7 is a view of a detail of the assembly shown in FIG. 6.

FIGS. 6 and 7 show the closing assembly 70 before the insertion of the pin 25 through the links 5 and 10 of the chain 1. As shown in the figures, the assembly 70 can be associated with a guide element 50, intended to be inserted manually through the holes 17, 19 of the links 5 and 10, to keep them aligned, and separable from the assembly 70 at a second moment, after insertion has taken place.

The guide element 50 has cylindrical shape and its outer diameter is smaller than the inner diameter of the distal end 30, or at most equal. The guide element 50 is fixedly attached in a non-permanent manner to the locking button 40 by means of a projection, or extension, 52 which inserts into the hole 54 of the button 40. In order to separate the guide element 50 from the assembly 70 it is sufficient to slip-off the extension 52 from the hole 54.

With particular reference to FIG. 7, which shows a detail of the section of FIG. 6, between the locking button 40 and the inner walls of the pin 25, at least at the distal end 30, there is a gap 72. Such a gap 72 allows the elastic deformation of the distal end 30 of the pin 25 in the insertion step. When the insertion of the pin 25 into the chain 1 has been completed, the gap 72 is cancelled out by radially deforming the button 40, in the outer direction opposite the axis X.

Figure 8:
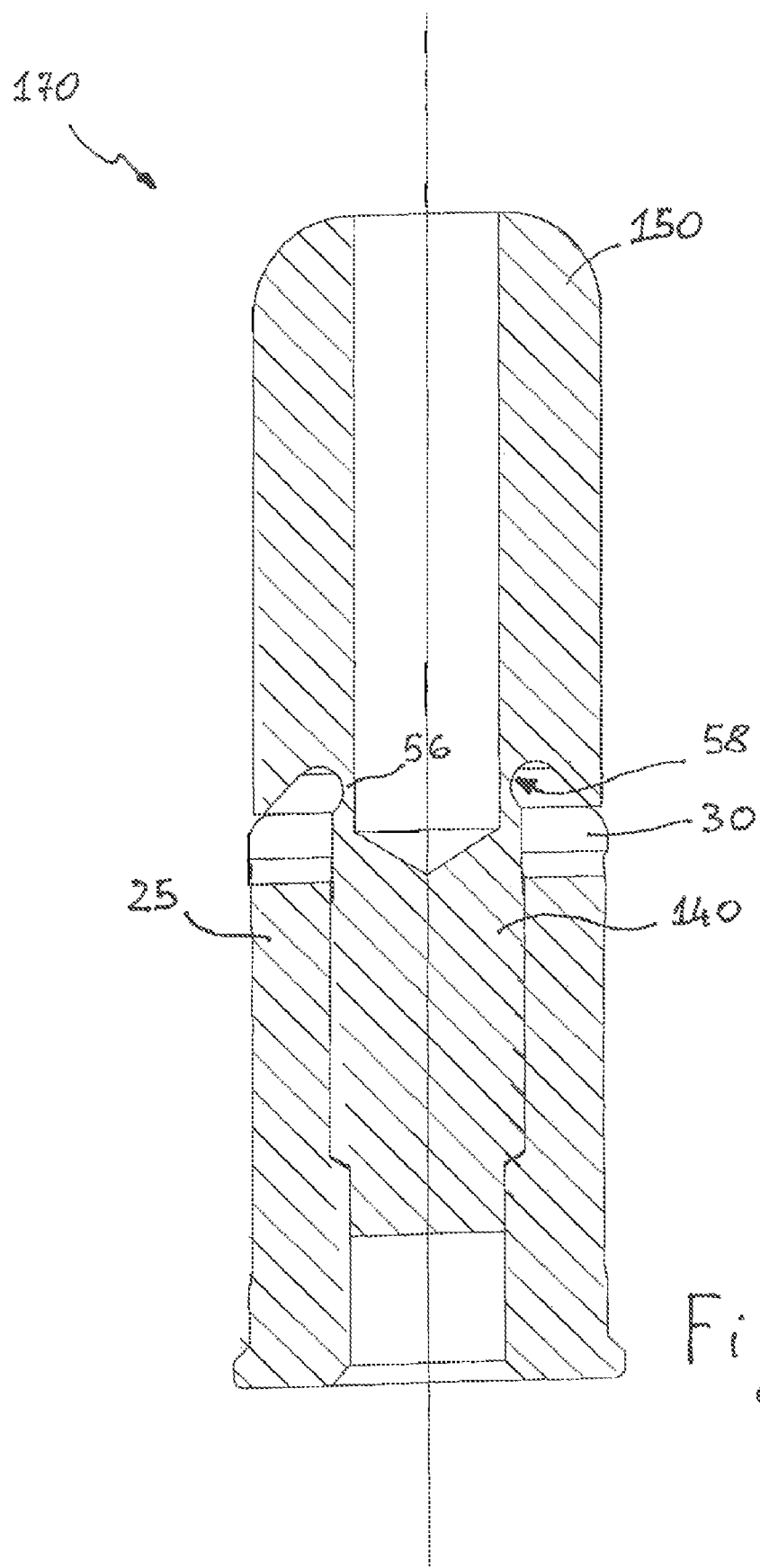
FIG. 8 is a longitudinal section view of an alternative embodiment of the assembly according to the present invention.

FIG. 8 is a longitudinal section view of an alternative embodiment of an assembly 170 in which the guide element 150 is made in one piece with the locking button 40 through a connection neck 56. The neck 56 is sized so as to break easily, i.e. to be broken, manually or with the help of a specific tool, after the insertion through the holes 17, 19. In particular, the neck 56 has a thin throat 58 outside the distal end 30. The outer position of the throat 58 ensures that following the breaking of the neck 56 the portion of the button 140 that must be deformed to block the elastic deformation of the pin 25 is not also taken away.

Figure 9:
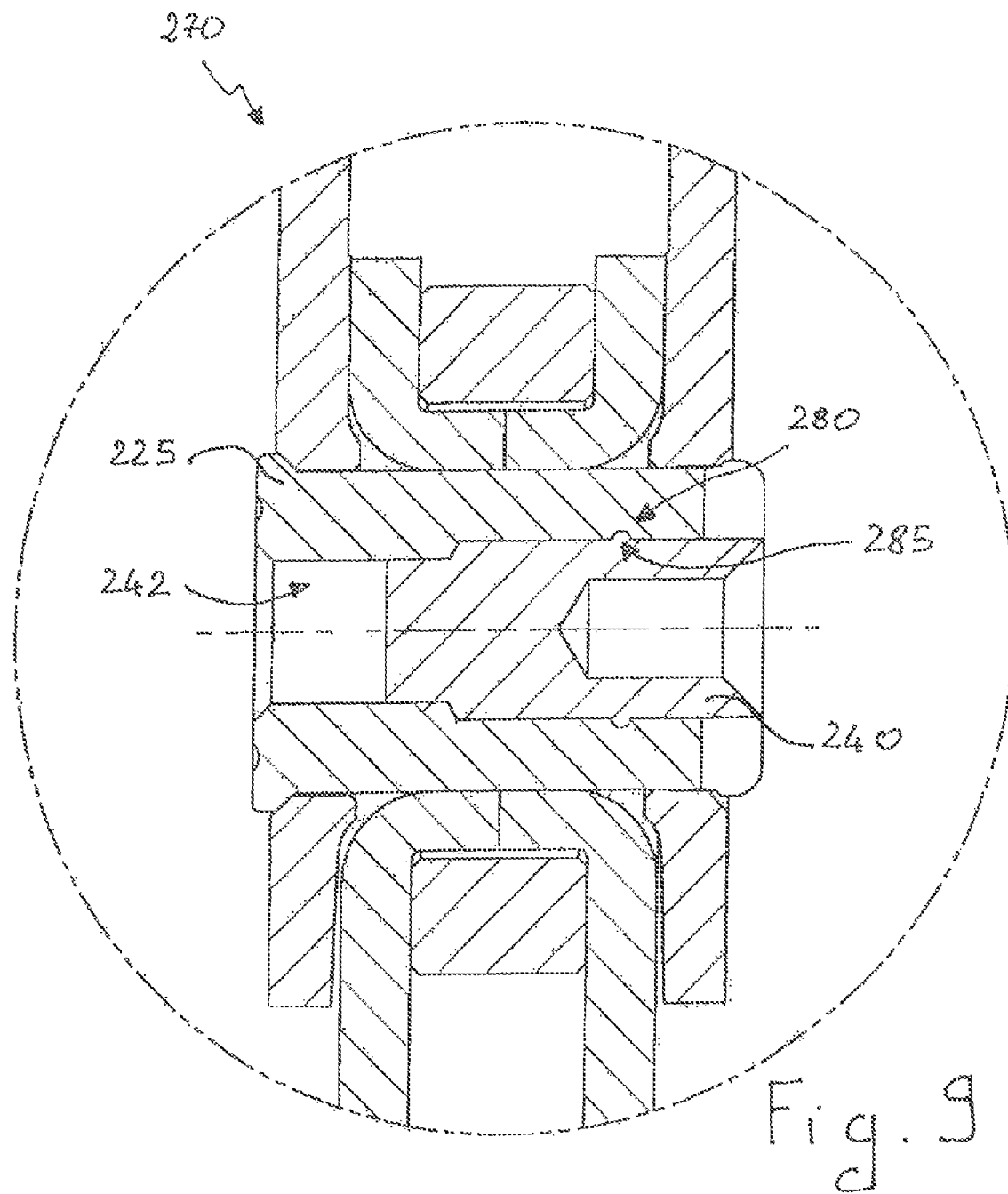
FIG. 9 is a longitudinal section view of an alternative embodiment of the chain according to the present invention.

FIG. 9 is a longitudinal section view of an alternative embodiment of an assembly 270 locked on a chain 1. In addition to the embodiment shown in FIG. 2, on the surface of the hole 242 of the articulating pin 225 an annular recess 280 is formed in which a corresponding annular projection 285 formed on the outer surface of the locking button 240 is inserted. The engagement of the projection 285 in the recess 280 maximizes the resistance to slip-off of the button 240 from the pin 225.

Figure 10:
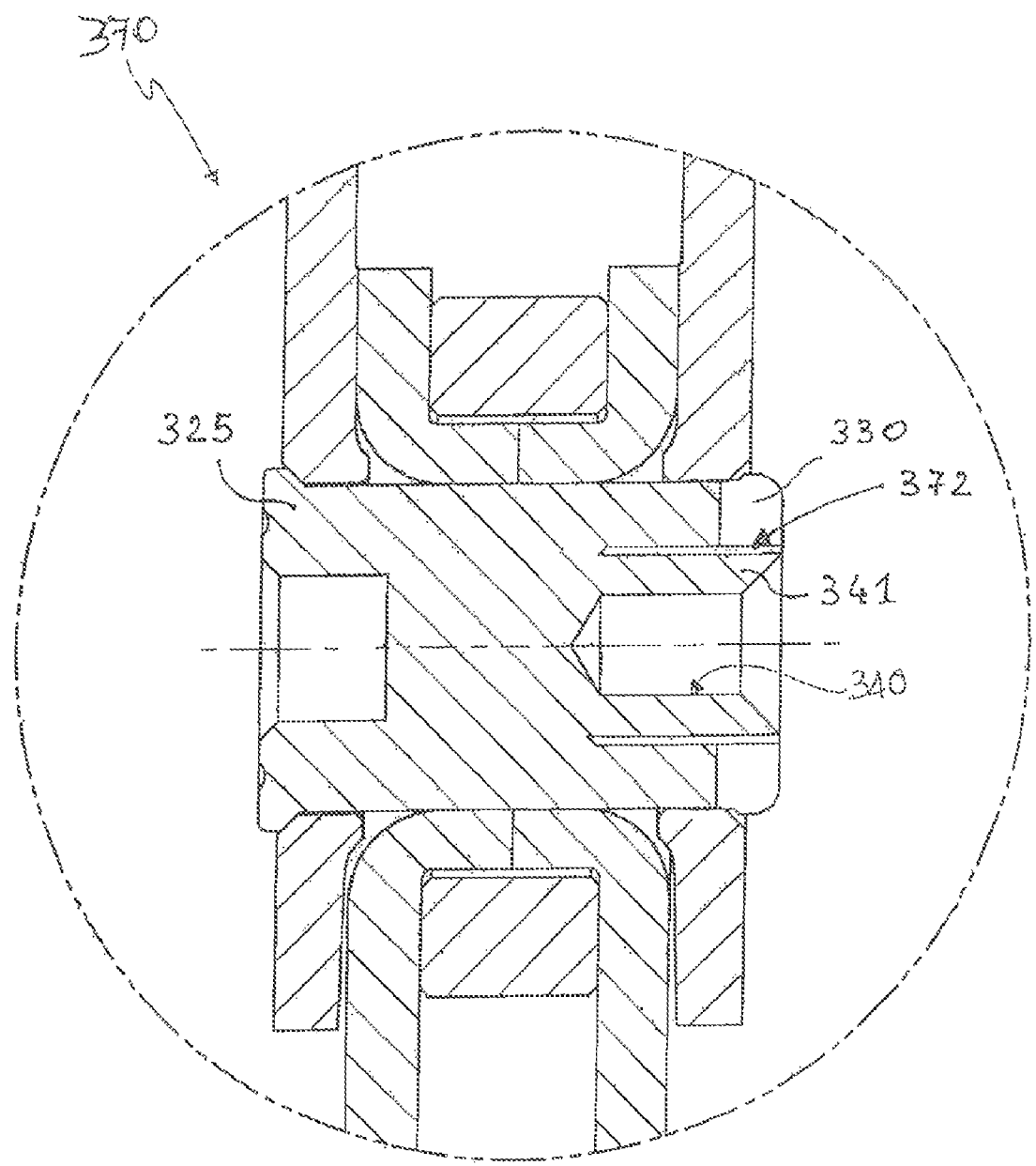
FIG. 10 is a longitudinal section view of an alternative embodiment of the chain according to the present invention.

FIG. 10 is a longitudinal section view of an alternative embodiment of an assembly 370 closed on a chain 1. The articulating pin 325 is in this case made in one piece with the corresponding locking button 340. The button 340 is shown before its plastic deformation. It is possible to see the gap 372 that separates the outer walls of the button 340 from the inner walls of the distal end 330 of the pin 325. The walls 330 of the distal end 30 of the pin 25 have an elastic behavior. The walls 341 of the flange 340 are thinner than the walls 330, and have a plastic behavior.

The embodiments shown in FIGS. 9 and 10 can be equipped with a corresponding guide element 50, separate from the locking button 240, 340 or integral with it.

The articulating pin 25 is shaped and sized so as to be used more than once. In this circumstance, the pin 25 is extracted from the chain 1 and the distal portion 30 conserves a residual elasticity sufficient to allow an effective insertion through the holes 17, 19 of the links of a second chain.

Figure 11:
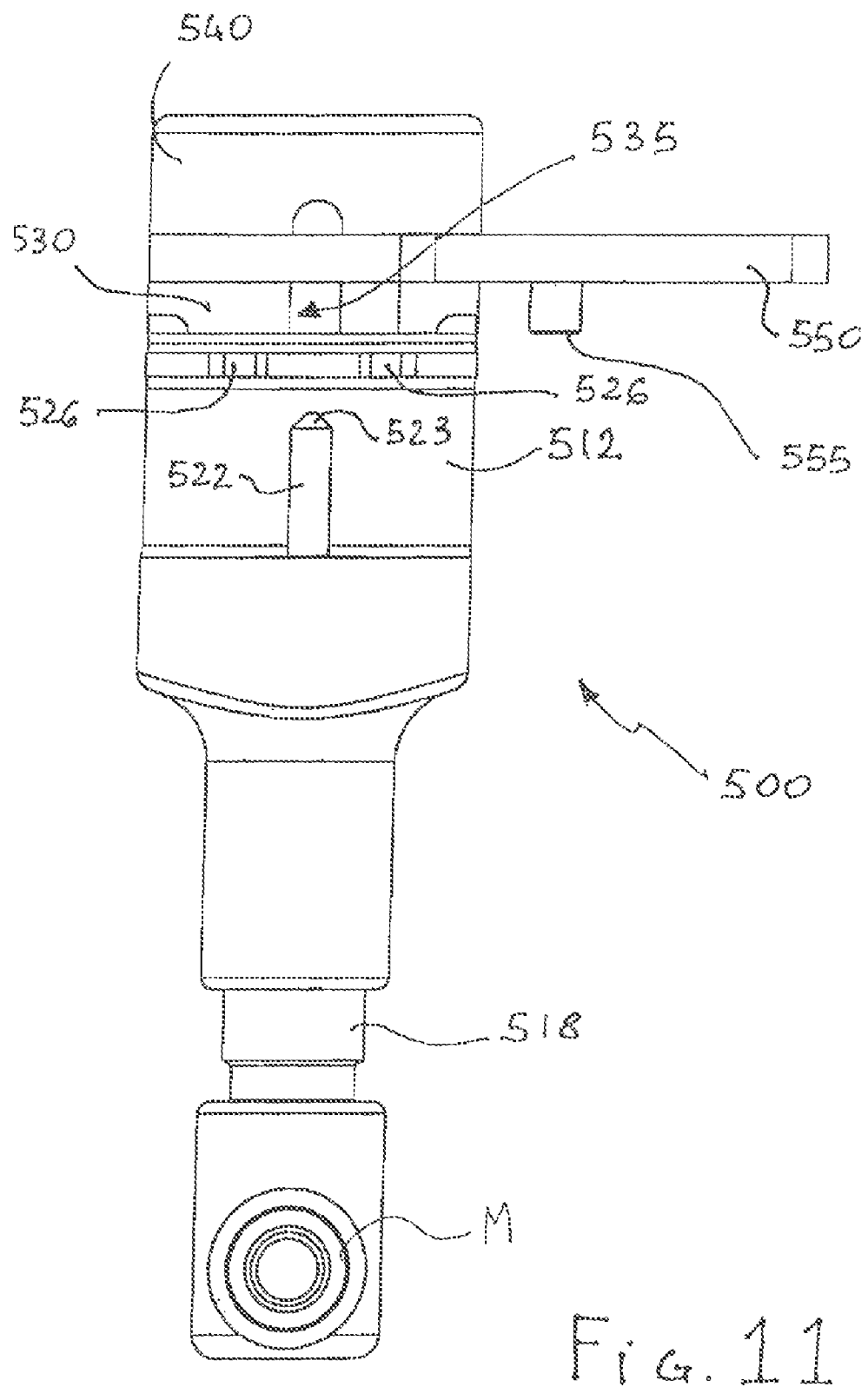
FIG. 11 is a plan view of a tool for closing a chain according to the present invention.

FIG. 11 shows a tool 500 for closing a chain 1. The tool 500 has a main body 512 equipped with a threaded hole for the engagement with a screw element 518. The screw element 518 can have a torque applied to it by means of a handle M. The screw element 518 comprises a punch 522 that moves forwards or backwards with respect to the main body 512 according to the handle M. The end 523 of the punch is preferably tapered as shown in FIG. 11.

The main body 512 comprises at least two teeth 526 intended to insert respectively into the inner link 10 and into the outer link 5 to be connected (FIG. 1). The teeth 526 are in a space located between the threaded element 518 and a support wall 530 of the links 5, 10.

Figure 12:
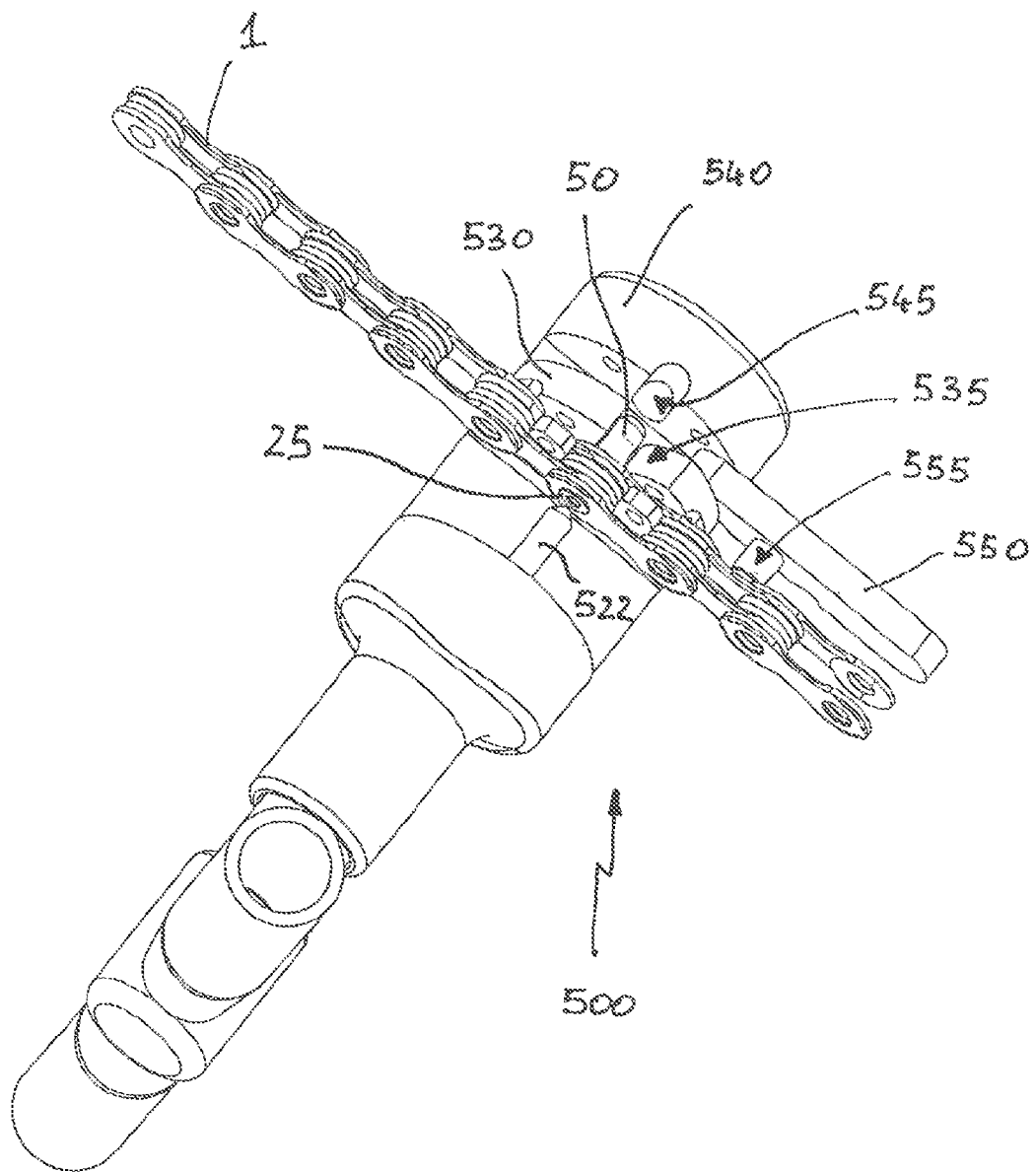
FIGS. 12 and 13 are perspective views of the closing tool of FIG. 11, in a use configuration.

The support wall 530 has a notch 535 aligned with the space between the teeth 526, so that it can receive the guide element 50 when an assembly 70 is inserted through the links 5, 10 to be articulated, as shown in FIG. 12.

With reference to FIG. 12, a second wall 540, parallel to the support wall 530, is arranged on the opposite side to the support wall 530 with respect to the teeth 526. The notch 535 also partially extends on the second wall 540 and intersects an expulsion hole 545 of the guide element 50.

Figure 13:
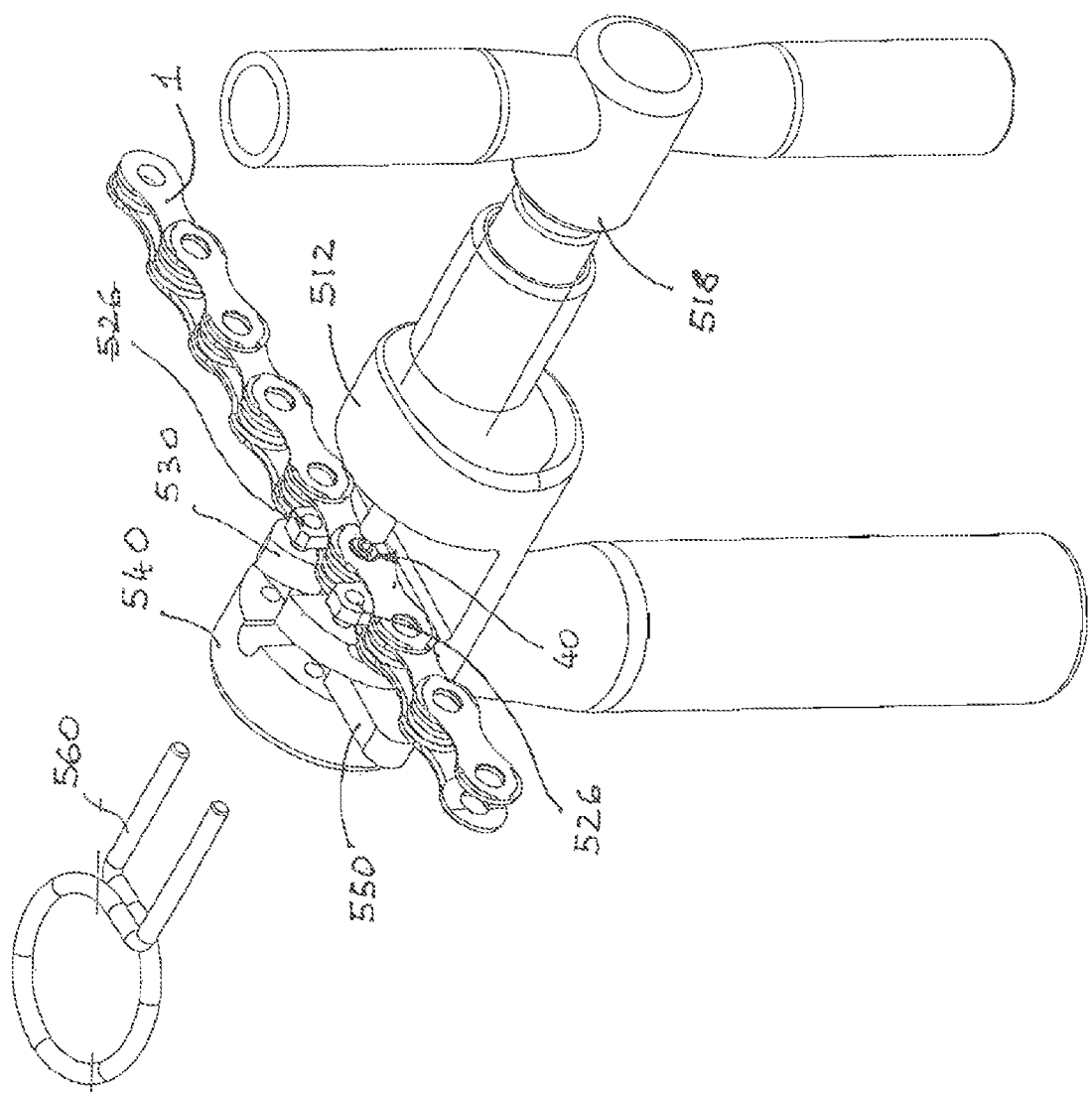

Between the support wall 530 and the second wall 540 there is an axial abutment element 555 rotatably coupled so that it can move in rotation between an insertion position of a pin 25 in a chain 1 engaged by the teeth 526, shown in FIG. 12, and a deformation position of the locking button 40 of the pin 25, shown in FIG. 13, this being the position in which it rests on the pin 25 itself. The axial abutment element 555 is integral with a support 550, defined as anvil-shaped element 550, hinged to the main body 512.

At least one from the axial abutment element 555 and the support 550 is interchangeable. The abutment element 555 is subject to wear at the area of interaction with the top portion 32 of the pin 25. It is sufficient to replace the abutment element 555, or else the relative support 550 when necessary in relation to the wear encountered. It is not necessary to replace the tool 500 or to completely disassemble it.

The open chain 1 is initially coupled with the tool 500 by inserting the links 5 and 10 to be articulated into the teeth 526. In this position the holes 17, 19 of the links to be joined are aligned and it is possible to manually insert a guide element 50, whereas the pin 25 associated with it is still outside of the links 5, 10. At a second moment, by applying a torque to the threaded element 518, the punch 522 thrusts the pin 25 through the holes 17, 19 and at the same time the guide element 50 is received in the notch 535 and expelled from the hole 545. The complete insertion of the pin 25 is obtained when the distal end 30 snaps shut on the exit 38 of the outer link 5 (FIG. 4).

Once this configuration is obtained, the operator takes care of extracting the chain 1 from the tool 500 and reinserting it into a position mirroring the previous one, i.e. with the locking button 40 facing towards the punch 522.

The anvil-shaped element 550 is rotated so that the axial abutment element 555 is in abutment against the top portion 32 of the pin 25, as shown in FIG. 13, so that the pin 25 cannot be expelled whereas the button 40 is plastically deformed by exerting a thrust with the punch 522 at least in part inserted inside of it.

Alternatively, the anvil-shaped element 550 can translate between the aforementioned two positions.

In order to block the chain 1 during the described operations, in addition to the teeth 526, a spring 560 (FIG. 13) is foreseen that can be inserted through holes in the teeth 526 and projecting from them.

Figure 14:
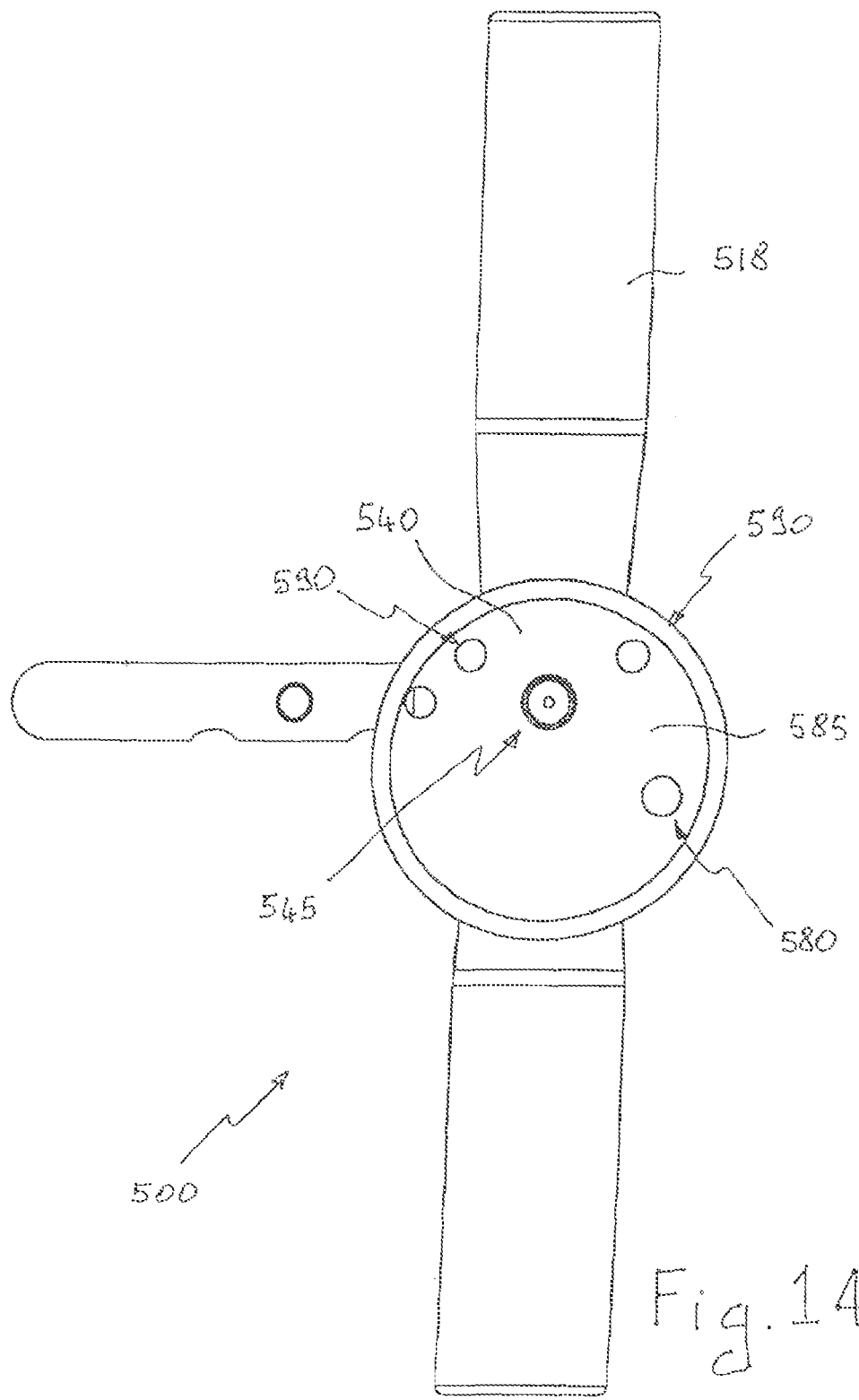
FIG. 14 is a rear view of the tool shown in FIG. 11.

FIG. 14 is a rear view of the tool 500, in which an additional hole 580 can be seen. The hole 580, which has a smaller diameter than the hole 545, has the function of at least partially receiving the guide element 150, in practice supplying a lever to break the throat 58, in the case in which the guide element 150 is made in one piece with the locking button 140.

In particular, the hole 580 has a diameter equal to 3.60 mm, or greater, and a depth of less than or equal to 8 mm.

The hole 580 can be positioned at any point of the tool 500, but preferably it is made in the main body 512, at a wall 585 opposite the screw element 518.

The wall 585 may be the same one on which the through holes 545 and the holes 590 are made (the latter ones being for the insertion of the spring 560 FIG. 13).

After the pin 25 has been inserted through the links 5 and 10, the chain 1 is removed by the tool 500, and the guide portion 150 is inserted into the hole 580. By applying a rotation to the tool 500 the guide portion 150 is separate from the button 140 at the throat 58.

The invention claimed is:

1. Tool for assembling a bicycle chain, comprising a main body having a longitudinal extension along a longitudinal direction, a groove formed in the main body having a notch that extends along the longitudinal direction, and a support element movably associated with the main body, the support element including an abutment element that protrudes along the longitudinal direction and is movable between a non-operative position, at which the abutment element is positioned outside of the notch of the groove formed in the main body, and an operative position, at which the abutment element is positioned within the notch of the groove formed in the main body.

2. Tool according to claim 1, wherein at least one from the support element and the abutment element is interchangeable.

3. Tool according to claim 1, further comprising a punch associated with the main body and movable along the longitudinal direction, the main body including an expulsion hole aligned with the punch, and an additional hole having an inner diameter that is smaller than an inner diameter of the expulsion hole.

* * * * *